United States Patent Office 3,527,591
Patented Sept. 8, 1970

3,527,591
SUSPENDING AGENT FOR LIQUID FERTILIZER
Earl L. Stauter, 5th King St.,
Fonda, Iowa 50540
No Drawing. Filed Feb. 14, 1968, Ser. No. 705,278
Int. Cl. C05f 7/00
U.S. Cl. 71—23                                           2 Claims

ABSTRACT OF THE DISCLOSURE

In a liquid fertilizer composition containing primary plant nutrients generally in excess of their solubility in the carrier liquid, a suspending agent which precludes any significant salting out of the primary plant nutrients. The suspending agent consists of kelp meal which is usually incorporated at the rate of about 1% to 2%, by weight, of the liquid fertilizer composition.

---

The present invention relates generally to liquid and slurry fertilizers and more particularly to an additive for such fertilizers. More particularly, the present invention relates to the provision of a novel suspending agent to generally preclude precipitation of the primary plant nutrient components in liquid and slurry fertilizer compositions.

As is well known, in recent years the utilization of fertilizer compositions in bulk form has become widespread. More particularly, liquid fertilizer compositions are becoming increasingly popular inasmuch as they can be uniformly distributed as well as provide more readily available nutrients for plants than is generally the case with most dry pulverulent fertilizer compositions.

Liquid fertilizer compositions are normally produced with as high a primary plant nutrient content as possible so as to minimize the expense incident to storing, handling or shipping large quantities of the base or carrier liquid utilized, i.e. water. In addition, it is also highly desirable, particularly for uniformity and ease of distribution of a liquid fertilizer upon the ground, to insure that the liquid composition remains free of any significant amount of precipitated components, which would tend to detract from the otherwise homogeneous nature of liquid fertilizer compositions and whereby such precipitants would render it difficult, if not imposible, to distribute such liquid fertilizer with conventional spray or sub-soil applicator devices.

Substantial sums have been spent in recent years in an effort to devise a simple economical means which would suspend "solidification" i.e. salting-out of the dissolved components of liquid fertilizer, while at the same time significantly reducing the corrosion of liquid fertilizer storage and handling equipment brought upon by the precipitated components being in direct contact with the interior surfaces of the equipment.

It is therefore a primary object of the present invention to provide a novel means for stabilizing aqueous suspensions of plant nutrients by the utilization of a minor amount of kelp meal therein.

Another object of the present invention is to provide economical means of facilitating the production, storage and handling of highly concentrated, homogeneous, stable and flowable aqueous plant food composition including at least one normally crystalline primary plant nutrient material which is present in an amount generally in excess of its solubility and wherein the incorporation of a minor proportion of kelp meal in the aqueous fertilizer composition generally precludes the precipitation of the normally crystalline plant nutrient so as to greatly minimize the problems encountered heretofore during the storage and handling of such aqueous fertilizer compositions.

A further object of this invention is to provide a novel, economical means of significantly precluding the salting-out of normally crystalline plant nutrient material from a liquid fertilizer composition by the addition thereto, normally during the suspending of the plant nutrient material therein, of a minor proportion of kelp meal.

Still another object of the present invention is to provide a novel and economical means of significantly reducing the salting-out of normally crystalline plant nutrient material from a liquid fertilizer composition within which it is normally suspended or dissolved and wherein the addition of kelp meal not only achieves the aforementioned object but also assists in significantly reducing the corrosion of vessels normally utilized in conjunction with the storage and handling of such a liquid fertilizer composition.

These and other objects will become apparent from the following detailed description of the invention.

Briefly, the aforementioned objects are achieved by the utilization of an algin-containing kelp meal such as comprising a technical grade of kelp meal derived from the seaweed or kelp as from the horsetail kelp, *Laminaria digitata*, for example, which technical grade of kelp meal contains some cellulose and is generally unbleached. A representative chemical analysis of such kelp meal is as follows.

| Component:       | Percent |
|------------------|---------|
| Protein          | 5.7     |
| Fat              | 2.6     |
| Fiber            | 7.0     |
| Carbohydrate     | 58.6    |
| Moisture         | 10.7    |
| Ash (minerals)   | 15.4    |

A representative chemical analysis of the carbohydrate present is as follows.

| Carbohydrate:     | Percent |
|-------------------|---------|
| Mannit            | 4.2     |
| Alginic acid      | 26.7    |
| Methylpentosans   | 7.0     |
| Laminarin         | 9.3     |
| Undefined sugars  | 11.4    |

The kelp, either in meal form or an aqueous suspension, i.e., a suspension of approximately 1 lb. of kelp meal to 1 gallon of water, which on the basis of weight comprises 1 lb. of kelp meal to 8 lbs. of water, is added to an aqueous fertilizer composition herein encompasses both slurry and liquid fertilizers comprising water and at least one normally crystalline primary plant nutrient, i.e. urea, ammonium nitrate, ammonium phosphate, potassium nitrate, etc., generally present in an amount in excess of their solubility at ambient temperature.

In addition, while not specifically discussed hereinabove, it will be noted that kelp meal also contains the trace elements necessary in plant nutrition, i.e. molybdenum, copper, iron, cobalt, zinc, boron and manganese thereby rendering the utilization of a kelp meal suspending agent in slurry and liquid fertilizer compositions far superior to the utilization of inert suspending agents utilized heretofore.

While it is not intended to be restricted by this analysis, it is believed that the addition of kelp meal to a normally supersaturated slurry or liquid fertilizer composition establishes a colloidal system wherein the salting-out of normally crystalline components of the fertilizer compositions is significantly retarded and the components which may precipitate to some extent as fine crystals remain suspended in the aqueous system at the instant of their formation without the formation of sufficient sediment to present a problem with regard to the corrosion of storage vessels or blocking of spray apparatus utilized in conjunction with the distribution of such compositions.

With further regard to the novel suspended agent set forth herein the kelp meal utilized is normally particulate wherein the particles arrange in size from approximately 10 to 200 mesh Tyler Standard, and thus the particles may be described as ranging from "granular" to "powdered." As indicated hereinabove the particular kelp meal may also be utilized in liquid form, sometimes referred to as "liquid seaweed," in which event, approximately 1 lb. of kelp meal is suspended in 8 lbs. of water and the resulting suspension utilized at the rate of approximately 2%, by volume, of the slurry or liquid fertilizer composition to be prepared in accordance with this invention.

The following examples are included to more clearly demonstrate the practice of the present invention. However, inasmuch as the present invention is applicable to any conventional slurry or liquid fertilizer composition regardless of the nature, or amounts, of the plant nutrients therein, it is to be understood that the exemplary fertilizer compositions set forth hereinafter in no way restricts the utilization of the novel suspending agent of the present invention to the fertilizer compositions described. Thus, in the present invention the products comprise generally saturated, or at least high concentration aqueous solutions of one or more fertilizer salts, together with a small amount of a combined trace element-nutrient-suspending agent present. The incorporation of the kelp which generally involves the utilization of less than 5%, and usually from 1 to 2%. In some formulations, such as relatively low plant nutrient analysis, i.e., N–P–K, the utilization of less than 1% of the kelp may only be required.

EXAMPLE I

A mixture of solid monoammonium phosphate and diammonium phosphate having a $P_2O_5$ to nitrigen weight ratio of 3:1 (42.9 parts), solid urea (34.8 parts), and solid potassium chloride (38.4 parts) were added to 79.9 parts of water at approximately 200° F. and the batch stirred until the plant nutrients were dissolved. While still hot, and thus before the occurrence of re-crystallization of any of the plant nutrients, approximately 1.9 parts, by weight, of finely divided kelp meal were intimately admixed with the hot composition. The aqueous fertilizer composition was then pumped to storage. The above resulted in the preparation of an approximately 12:12:12 fertilizer composition. After the composition cooled to ambient temperature, i.e., 68° F. it was visually ascertained that the composition remained substantially homogeneous and flowable without any significant salting-out of the normally crystalline plant nutrients therein. Representative portions of the composition were withdrawn and stored for extended periods of time under greatly fluctuating temperature conditions, i.e., such as normally encountered in the storing and handling of liquid fertilizer. After extended storage the test samples containing the novel trace element-nutrient-suspending agent set forth herein were compared with control samples, i.e., those comprising the same fertilizer composition minus the novel agent of the present invention, and it was observed that no significant re-crystallization of the normally crystalline nutrients occurred therein and that the control samples were characterized by the presence of significant amounts of re-crystallized plant nutrients to the extent that they actually effected corrosion of the sample containers and were also found to be virtually unsuitable for distribution in the usual manner by means of conventional spray apparatuses.

EXAMPLE II

A potassium nitrate solution comprising 50 parts by weight of the salt to 100 parts by weight of total composition was prepared by dissolving the salt in hot water. The solution so prepared was maintained at a temperature of approximately 200° F. and then divided into two generally equal portions. To one of the portions was added approximately 2%, by volume, of finely divided kelp meal, in the form of kelp meal suspended in water at the ratio of approximately 1 part by weight of kelp to 8 parts by weight of water. The treated and untreated samples were then permitted to cool to slightly below 32° F. and visually observed for the re-crystallization of the potassium nitrate. The treated sample, while being somewhat more viscous than at elevated room temperature, still remained flowable and suitable for spray application by virtue of the absence of any significant proportion of crystals which would interfere with such utilization. The control example however, was observed to be sustantially solidified slightly below 32° F. and upon being permitted to return to room temperature was characterized by a significant proportion of re-crystallized potassium nitrate which rendered the spraying of the control sample virtually impossible due to the presence of such crystals.

The foregoing is considered to be merely exemplary of the principles of the present invention and accordingly I do not wish to be limited except by the scope of the appended claims.

What is claimed as new is as follows:

1. In a flowable and generally sprayable aqueous plant food composition comprising water, at least one normally crystalline primary plant nutrient material present in an amount generally in excess of its solubility in said water at ambient temperatures normally encountered in the storage and handling of said fertilizer composition, the improvement comprising kelp meal colloidally dispersed in said water, said kelp meal being present in an amount of about 1% to 2% by weight of the aqueous plant food composition, said kelp meal being present in an amount sufficient to form a generally stable suspension of said at least one primary plant nutrient whereby any significant precipitation thereof is generally precluded without effecting thickening of said composition to such an extent that it is no longer sprayable.

2. The method of effectively precluding any significant precipitation of normally crystalline primary plant nutrients in a flowable, normally sprayable, aqueous plant food composition which comprises colloidally dispersing in said aqueous plant food composition kelp meal present in an amount of about 1% to 2% by weight of the aqueous plant food composition to form a stable suspension of said primary plant nutrients without effecting thickening the aqueous plant food composition to such an extent that it is no longer sprayable.

References Cited

UNITED STATES PATENTS 3,234,004　2/1960　Smith et al. _____ 71—34

REUBEN FRIEDMAN, Primary Examiner

R. BARNES, Assistant Examiner

U.S. Cl. X.R.

71—28, 30, 64